(12) United States Patent
Zhou et al.

(10) Patent No.: US 12,541,482 B2
(45) Date of Patent: Feb. 3, 2026

(54) COMMUNICATION METHOD AND APPARATUS FOR COMPUTING POWER CLUSTER, ELECTRONIC DEVICE AND STORAGE MEDIUM

(71) Applicant: Beijing Baidu Netcom Science Technology Co., Ltd., Beijing (CN)

(72) Inventors: Mo Zhou, Beijing (CN); Zhaogeng Li, Beijing (CN); Dou Shen, Beijing (CN); Yanpeng Wang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 19/084,322

(22) Filed: Mar. 19, 2025

(65) Prior Publication Data

US 2025/0217310 A1    Jul. 3, 2025

(30) Foreign Application Priority Data

Dec. 11, 2024  (CN) .......................... 202411814939.1

(51) Int. Cl.
G06F 15/173   (2006.01)
H04L 67/10    (2022.01)
H04L 69/163   (2022.01)

(52) U.S. Cl.
CPC ........ *G06F 15/17331* (2013.01); *H04L 67/10* (2013.01); *H04L 69/163* (2013.01)

(58) Field of Classification Search
CPC .. G06F 15/17331; H04L 67/10; H04L 69/163
See application file for complete search history.

(56) References Cited

U.S. PATENT DOCUMENTS

| 11,444,790 | B1 | 9/2022 | Herr et al. | |
|---|---|---|---|---|
| 2014/0119174 | A1* | 5/2014 | Bakhshi | H04L 12/46 370/254 |
| 2019/0208023 | A1* | 7/2019 | Suryanarayana | H04L 67/148 |

FOREIGN PATENT DOCUMENTS

| CN | 117857658 A | 4/2024 |
|---|---|---|
| CN | 117857660 A | 4/2024 |
| CN | 117896445 A | 4/2024 |

OTHER PUBLICATIONS

Notice of Allowance dated Feb. 11, 2025 in Chinese Application No. 202411814939.1, 7 pages.
(Continued)

*Primary Examiner* — Hua Fan
(74) *Attorney, Agent, or Firm* — Knobbe, Martens, Olson & Bear, LLP

(57) ABSTRACT

A communication method, apparatus, electronic device and storage medium for a computing power cluster are provided. An implementation of the method includes: during a process of communicating with a communication receiver using Remote Direct Memory Access (RDMA) protocol, obtaining a first packet loss rate corresponding to the RDMA protocol; in response to the first packet loss rate being higher than a first preset packet loss rate, initiating a first handshake request to the communication receiver for requesting to switch to Transmission Control Protocol (TCP) for communication; receiving a first handshake response returned by the communication receiver for the first handshake request, and determining a first starting transmission position of data according to a last data receiving position in the first handshake response; and communicating, by using the TCP, with the communication receiver starting from data corresponding to the first starting transmission position.

20 Claims, 6 Drawing Sheets

(56) References Cited

OTHER PUBLICATIONS

Gao et al., "When Cloud Storage Meets RDMA", USENIX Association, 18th USENIX Symposium on Networked Systems Design and Implementation, Apr. 12-14, 2021, pp. 519-533.
Extended European Search Report issued in European Patent Application No. 25164854.9, dated Sep. 11, 2025, in 10 pages.

* cited by examiner

COMMUNICATION METHOD AND APPARATUS FOR COMPUTING POWER CLUSTER, ELECTRONIC DEVICE AND STORAGE MEDIUM

CROSS-REFERENCE TO RELATED APPLICATION

This application claims the priority from Chinese Patent Application No. 202411814939.1, filed in the National Intellectual Property Administration (CNIPA) on Dec. 11, 2024, the contents of which are hereby incorporated by reference in their entirety.

TECHNICAL FIELD

The present disclosure relates to the technical field of communication, in particular to the technical fields such as graphics processors, computing power clusters, model training, and generative large language models, and more particularly to a communication method and apparatus for a computing power cluster, an electronic device, a computer readable storage medium, and a computer program product.

BACKGROUND

With the increasing demand for computing power in the era of large models, the requirement for the number of chips within a cluster is getting higher and higher. A single computing power cluster with thousands of cards or even tens of thousands of cards can no longer meet the demand. This has led to the situation that the training on basis of larger-scale computing power clusters in the future has to rely on the joint efforts of multiple computing power clusters. These computing power clusters are usually distributed in different physical locations (such as in different machine rooms), and may even span regions.

How to make efficient use of these computing power clusters and minimize the significant impact of cross-machine-room communication time on training performance is an urgent problem to be solved by those skilled in the art.

SUMMARY

Embodiments of the present disclosure propose a communication method and apparatus for computing power cluster, an electronic device, a computer readable storage medium, and a computer program product.

In a first aspect, some embodiments of the present disclosure provide a communication method for a computing power cluster, applied to a communication initiator. The method includes: during a process of communicating with a communication receiver using Remote Direct Memory Access (RDMA) protocol, obtaining a first packet loss rate corresponding to the RDMA protocol; in response to the first packet loss rate being higher than a first preset packet loss rate, initiating a first handshake request to the communication receiver for requesting to switch to Transmission Control Protocol (TCP) for communication; receiving a first handshake response returned by the communication receiver for the first handshake request, and determining a first starting transmission position of data according to a last data receiving position in the first handshake response; and communicating, by using the TCP, with the communication receiver starting from data corresponding to the first starting transmission position.

In a second aspect, some embodiments of the present disclosure provide a communication apparatus for a computing power cluster, applied to a communication initiator. The apparatus includes: a first packet loss rate acquisition unit, configured to obtain a first packet loss rate corresponding to Remote Direct Memory Access (RDMA) protocol during a process of communicating with a communication receiver using the RDMA protocol; a TCP protocol switching handshake request initiating unit, configured to initiate a first handshake request to the communication receiver for requesting to switch to Transmission Control Protocol (TCP) for communication in response to the first packet loss rate being higher than a first preset packet loss rate; a first handshake response receiving and first starting transmission position determining unit, configured to receive a first handshake response returned by the communication receiver for the first handshake request, and determine a first starting transmission position of data according to a last data receiving position in the first handshake response; a TCP protocol communication unit, configured to communicate, by using the TCP, with the communication receiver starting from data corresponding to the first starting transmission position.

In a third aspect, some embodiments of the present disclosure provide an electronic device. The electronic device includes: at least one processor; and a memory in communication connection with the at least one processor; where the memory stores instructions executable by the at least one processor, and the execution of the instructions by the at least one processor enables the at least one processor to execute the communication method for a computing power cluster according to the first aspect.

In a fourth aspect, some embodiments of the present disclosure provide a non-transitory computer-readable storage medium storing computer instructions, where the computer instructions are used to cause a computer to execute the communication method for a computing power cluster according to the first aspect.

It should be understood that contents described in this section are neither intended to identify key or important features of embodiments of the present disclosure, nor intended to limit the scope of the present disclosure. Other features of the present disclosure will become readily understood in conjunction with the following description.

BRIEF DESCRIPTION OF THE DRAWINGS

After reading detailed descriptions of non-limiting embodiments given with reference to the following accompanying drawings, other features, objectives and advantages of the present disclosure will become more apparent.

FIG. 5-1 is a structural schematic diagram of cross-data-center transmission dedicated line interconnection and DCN interconnection provided by an embodiment of the present disclosure;

FIG. 5-2 is a structural schematic diagram of a method for obtaining the packet loss rates corresponding to RDMA and TCP from different shared memories respectively provided by an embodiment of the present disclosure;

FIG. 5-3 is a flowchart of a method for obtaining the packet loss rates of RDMA and TCP provided by an embodiment of the present disclosure;

FIG. 5-4 is a process schematic diagram of the communication initiator and the communication receiver switching between the transmission protocols during cross-machine-room transmission provided by an embodiment of the present disclosure;

DETAILED DESCRIPTION OF EMBODIMENTS

Example embodiments of the present disclosure are described below with reference to the accompanying drawings, where various details of the embodiments of the present disclosure are included to facilitate understanding, and should be considered merely as examples. Therefore, those of ordinary skills in the art should realize that various changes and modifications can be made to the embodiments described herein without departing from the scope and spirit of the present disclosure. Similarly, for clearness and conciseness, descriptions of well-known functions and structures are omitted in the following description. It should be noted that the embodiments in the present disclosure and the features in the embodiments may be combined with each other on a non-conflict basis.

In the technical solution of the present disclosure, the processing of user personal information involved, including collection, storage, use, processing, transmission, provision and disclosure, etc. are all in compliance with relevant laws and regulations, and do not violate public order and good customs.

Figure 1:
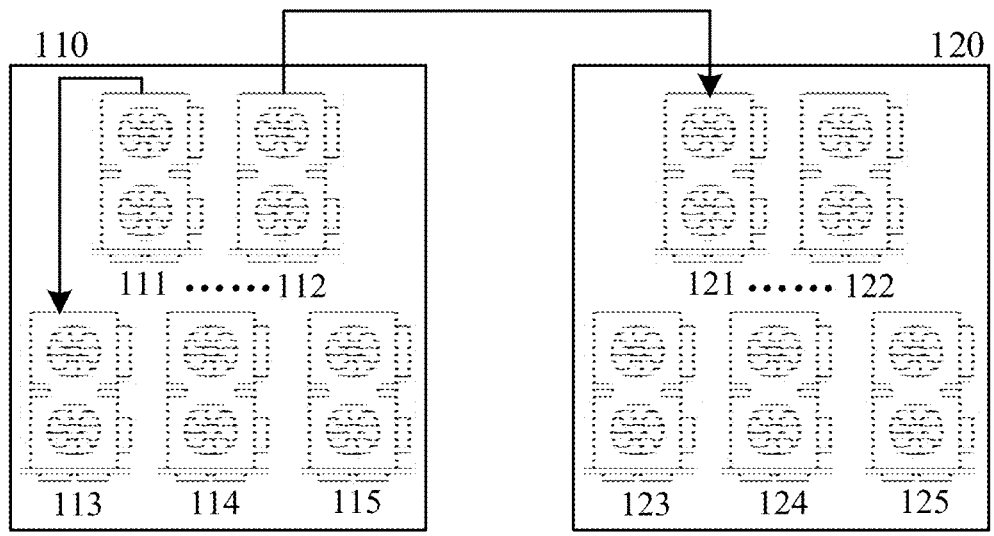
FIG. 1 is an exemplary system architecture in which embodiments of the present disclosure may be applied.

FIG. 1 illustrates an exemplary system architecture 100 to which a communication method and apparatus for computing power cluster(s), an electronic device and a computer readable storage medium according to embodiments of the present disclosure may be applied.

As shown in FIG. 1, the system architecture 100 may include a first computing power cluster 110 and a second computing power cluster 120, where the first computing power cluster 110 includes a plurality of graphics processors, such as 111, 112, 113, 114, and 115 existing in the form of graphics cards (the number is not limited to five, only a few are shown in FIG. 1 as an example), and the second computing power cluster 120 also includes a plurality of graphics processors, such as 121, 122, 123, 124, and 125 also in the form of graphics cards.

In different computing power clusters, any device initiating communication may be regarded as a communication initiator. It may be that only one of the graphic processors constituting a computing power cluster is regarded independently as the communication initiator, or when all graphic processors in the entire computing power cluster initiate communication and transmit data to graphic processors in another computing power cluster, the entire computing power cluster initiating the communication may be collectively regarded as the communication initiator.

The graphic processor constituting the computing power cluster may, independently or via a communication component, in conjunction with a pre-installed communication control application, realize communication with other graphic processor(s) within the same computing power cluster or with other graphic processor(s) within other computing power cluster(s). It should be noted that there may be many reasons and purposes for initiating communication, which is not limited herein, and the corresponding solution is given only for the communication method and the determination of transmission parameters.

The graphics processor is usually represented as hardware. Of course, in specific scenarios (e.g., simulation scenarios), it may also be represented as software or a software runtime product, which is not limited herein.

The communication initiator may communicate with a communication receiver through a built-in communication control application. Taking the graphics card 112 as the communication initiator and the graphics card 121 as the communication receiver in FIG. 1 as an example, the graphics card 112 may realize cross-cluster communication in the following form when running the communication control application: first, during a process of communicating with a communication receiver using Remote Direct Memory Access (RDMA) protocol, obtaining a first packet loss rate corresponding to the RDMA protocol; in response to the first packet loss rate being higher than a first preset packet loss rate, initiating a first handshake request to the communication receiver for requesting to switch to Transmission Control Protocol (TCP) for communication; receiving a first handshake response returned by the communication receiver for the first handshake request, and determining a first starting transmission position of data according to a last data receiving position in the first handshake response; and communicating, by using the TCP, with the communication receiver starting from data corresponding to the first starting transmission position.

In addition to the cross-cluster communication presented in the above example, FIG. 1 also illustrates that the graphics card 111, which is the communication initiator, may communicate with the graphics card 113 within the cluster, which is the communication receiver, and this communication process may likewise be realized under the control of the communication control application. However, since intra-cluster communication is not affected by fluctuations in the external network environment, a first packet-loss rate that is higher than the first preset packet-loss rate usually does not occur when the RDMA protocol is preferentially adopted. Therefore, in practice, the above-provided protocol-switching strategy may do not take effect during intra-cluster communication. Of course, it is also possible to apply the above-mentioned switching strategy only to cross-cluster communication scenarios and configure only the RDMA protocol for intra-cluster communication scenarios.

Further, when the communication receiver cannot clearly determine whether it belongs to a different computing power cluster than the communication initiator, multiple manners may be used for confirmation, such as by using communication latency, or packet loss rate, to confirm whether the transmission environment is intra-cluster or cross-cluster.

It should be understood that the number of the graphics cards, the graphics processors and the computing power clusters in FIG. 1 is merely illustrative. Depending on implementation needs, there may be any number of the graphics cards, the graphics processors and the computing power clusters.

Figure 2:
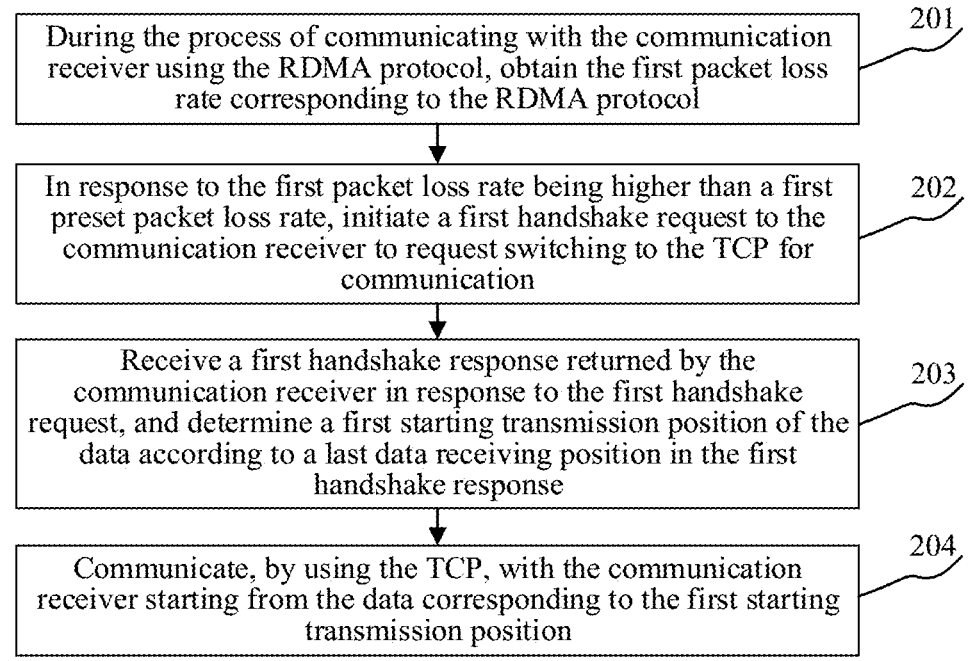
FIG. 2 is a flowchart of a communication method for switching from the RDMA protocol to the TCP protocol provided by an embodiment of the present disclosure.

Referring to FIG. 2, FIG. 2 is a flowchart of a communication method for switching from the RDMA protocol to the TCP protocol provided by an embodiment of the present disclosure. The process 200 includes the following steps.

Step 201: During the process of communicating with a communication receiver using the RDMA protocol, obtain a first packet loss rate corresponding to the RDMA protocol.

In this step, the execution body (such as the graphics card 112 and graphics card 111 shown in FIG. 1, both belonging to the first computing power cluster) of the communication method may obtain the first packet loss rate corresponding to the RDMA protocol, during the communication with the communication receiver (such as the graphics card 121 and graphics card 113 shown in FIG. 1, belonging to the second computing power cluster and the first computing power cluster respectively) using the RDMA protocol.

The Remote Direct Memory Access (RDMA) protocol is a network protocol that allows a computer to directly access the memory of a remote computer. It is commonly used in scenarios such as High-Performance Computing (HPC), data centers, and storage networks. RDMA can achieve high-speed data transmission between hosts without the intervention of the operating system kernel, thus having extremely low latency and high bandwidth. When using the RDMA protocol, the sender (i.e., the communication initiator) directly writes data into the memory of the receiver (usually referred to as the communication receiver) without the need for operating system intervention. This direct memory access reduces the intermediate layers in the data transmission process, thereby improving data transmission efficiency.

The Packet Loss Rate refers to the proportion of data packets that fail to reach the receiver successfully during the data transmission process due to various reasons (such as network congestion, transmission errors, hardware failures, etc.). The packet loss rate is an important indicator for measuring the quality of network communication, usually expressed as a percentage. A poor network environment will lead to a high packet loss rate. That is, a high packet loss rate can reflect that the current network communication quality is poor, and it may even affect the reliability and performance of the application. The packet loss rate may be determined in the following ways.

1) Real-time monitoring: Network monitoring modules may be deployed at the communication initiator and the communication receiver respectively to track packet loss in real-time. In particular, the communication initiator and the communication receiver may record the sending and receiving status of each data packet, and monitor whether there is packet loss through the protocol stack or hardware-assisted mechanisms.

2) Packet loss statistics supported by the protocol: The RDMA protocol itself may also support packet loss statistics in the underlying transmission. The communication initiator and the communication receiver may obtain packet loss information according to feedback information (such as error reports, ACK packets, etc.) in the protocol.

3) Network-layer or application-layer packet loss rate: In some implementations, the acquisition of the packet loss rate is not limited to physical-layer packet loss, but may also include packet loss at higher layers (such as the transport layer or application layer), depending on the design of the network monitoring scheme. For example, a self-built packet loss rate statistics process may be used to store the packet loss rate into a place that is easy to access, such as shared memory.

The first packet loss rate described in this step refers to the packet loss rate counted during the data communication between the communication initiator (which is execution body) and the communication receiver using the RDMA protocol, and it is expected to use this first packet loss rate to reflect the current network communication quality.

An implementation that is included in an embodiment but is not limited to is: the first packet loss rate is obtained from a first shared memory corresponding to the RDMA network interface card (i.e., NIC). In particular, the first packet loss rate is obtained from the register of the RDMA network interface card by the first packet loss rate acquisition process and is stored into the first shared memory. The first packet loss rate acquisition process is started when communicating using the RDMA protocol. That is, when performing data communication using the RDMA protocol, the RDMA protocol may default to storing the statistically obtained packet-loss-related information into the register of its RDMA network interface card. However, the collective communication library usually does not provide an operation instruction corresponding to obtaining the packet loss rate of the RDMA protocol. Therefore, in this implementation, the packet loss rate information is transferred from the register to the first shared memory by means of a self-built packet loss rate acquisition process, which is convenient for acquisition.

Step 202: In response to the first packet loss rate being higher than a first preset packet loss rate, initiate a first handshake request to the communication receiver for requesting to switch to TCP for communication.

In this step, based on the situation where the first packet loss rate obtained in Step 201 is higher than the first preset packet loss rate, the above-mentioned execution body may initiate a first handshake request to the communication receiver for requesting to switch to TCP for communication. The first preset packet loss rate is a boundary value or critical value determined based on historical experience, for measuring whether the current network communication quality under the RDMA protocol is good or poor. That is, if the actual first packet loss rate is higher than the first preset packet loss rate, it may be considered that the current network communication quality is poor. Conversely, if the actual first packet loss rate is not higher than the first preset packet loss rate, it may be considered that the current network communication quality is good. Specifically, the first preset packet loss rate may be set by experts with relevant experience in combination with the actual situation in a specific application scenario, or the first preset packet loss rate may be obtained by analyzing the input samples representing the current application scenario through a pre-trained model. There is no specific limitation here. More particularly, the first preset packet loss rate may also be set to 4%.

Since when the first packet loss rate is higher than the first preset packet loss rate, it means that the execution body is in a network environment with poor network communication quality during the current period of communicating with the communication receiver using the RDMA protocol. Therefore, in order to avoid the high packet loss rate caused by the poor network communication quality affecting the overall training task, the above-mentioned execution body may initiate a first handshake request to the communication receiver in this step, indicating the intention to switch the current RDMA protocol to the TCP protocol, which can bring a relatively lower packet loss rate in a poor network environment. That is, this first handshake request is used to inform the communication receiver that the communication initiator intends to switch the communication protocol and intends to switch to the TCP protocol.

The reason why the TCP protocol can bring a lower packet loss rate than the RDMA protocol in a poor network environment is mainly related to the working mechanisms, error recovery strategies, and network adaptability of these two protocols. The detailed reasons are listed below.

1) Error recovery mechanism: TCP is a connection-oriented protocol with built-in powerful error detection and recovery mechanisms. In particular, TCP uses the retransmission mechanism to ensure reliable data transmission. When a data packet is lost or damaged, TCP detects the packet loss through sequence numbers and acknowledgment (ACK), and re-sends the lost data packet. Even in an unstable or high-latency network environment, TCP will keep trying to re-transmit the lost packet until the transmission is successful, thus effectively reducing the packet loss rate.

The RDMA protocol directly transfers data in memory. It is usually used in low-latency, high-bandwidth network environments and improves data transmission efficiency by bypassing the operating system kernel. The RDMA protocol does not have built-in retransmission and error recovery mechanisms like TCP. In a poor network environment, if packet loss occurs, the RDMA may not be able to handle this situation effectively, resulting in the inability to recover the lost packets in a timely manner.

2) Flow control and congestion control: TCP has flow control and congestion control mechanisms, which can dynamically adjust the data transmission rate according to the network conditions. TCP continuously adjusts the size of the sending window according to the network bandwidth, latency, and packet loss situation, to avoid network overload and excessive packet loss. In a poor network environment, TCP's congestion control (such as slow start, congestion avoidance, fast re-transmission, etc.) can effectively prevent network collapse or further packet loss.

During the transmission process, the RDMA directly operates on the memory, avoiding the overhead of the traditional network protocol stack, but it usually relies on the underlying network hardware (such as InfiniBand, RoCE, etc.) to achieve flow control. If the network environment is poor, the RDMA may not have sufficient adaptability and is likely to lose data when network congestion or errors occur.

3) Network quality and robustness: TCP considers an environment with unstable network quality when the TCP is designed. Therefore, TCP mechanisms, including retransmission, acknowledgment, flow control, congestion control, etc., can cope with various network quality changes. In a poor network environment (such as high packet loss rate, network jitter, etc.), TCP can ensure the reliability of data transmission through its self-adaptive mechanisms.

The RDMA is usually used in data center networks and has high requirements for the network. If there is packet loss or congestion in the network, the RDMA may not be able to make effective compensation because it lacks protocol-level error recovery and control like TCP. The RDMA protocol is more dependent on the performance of the underlying network hardware, and once the network quality deteriorates, data loss will be more serious.

4) Application scenario differences: TCP is often used in reliability and error recovery oriented application scenarios. TCP can ensure that data arrives at the receiver in order and reliably, and is suitable for various network environments, including unstable networks.

The RDMA is usually used in high-performance computing, storage, and other scenarios with extremely low latency requirements, and is suitable for high-quality, low-packet-loss-rate network environments, such as InfiniBand or RoCE (i.e., RDMA over Converged Ethernet, a technology that enables data transmission by attaching the RDMA protocol to Ethernet frames). In these high-quality networks, the RDMA can give full play to its advantages of low latency and high throughput. However, in a poor network environment, it lacks an effective packet-loss recovery mechanism and may not be able to ensure reliable data transmission.

5) Interaction and adaptability at the network layer: With the support of the operating system kernel, TCP may adjust to adapt to different network environments. For example, TCP may use congestion control algorithms (such as TCP Reno, Cubic, etc.) to cope with different network conditions, and may appropriately adjust the data sending rate according to the network load, thereby avoiding further packet loss.

The RDMA directly interacts with the network hardware, bypassing the traditional protocol stack of the operating system. Although this can reduce latency, it also means that the RDMA has weak adaptability when the network status is poor, and is prone to packet loss or failure to adjust the transmission rate in a timely manner.

Therefore, because the TCP protocol has powerful functions such as error recovery mechanisms, congestion control, and flow control, and can better adapt to network instability, so that TCP achieves a lower packet loss rate compared to the RDMA protocol. This step chooses to timely switch the RDMA protocol to the TCP protocol when that the current communication environment is poor is found through the first packet loss rate.

Step 203: Receive a first handshake response returned by the communication receiver for the first handshake request, and determine a first starting transmission position of data according to the last data receiving position in the first handshake response.

Based on Step 202, the above-mentioned execution body may receive a first handshake response returned by the communication receiver for the first handshake request, and determine a first starting transmission position of data according to the last data receiving position in the first handshake response. That is, after receiving the first handshake request sent by the above-mentioned execution body, the communication receiver parses the first handshake request and learns that the communication initiator intends to change the data transmission protocol used for subsequent data transmission, and specifically change to using the TCP protocol. Accordingly, when the communication receiver also supports the TCP protocol, the communication receiver may return a first handshake response to the communication initiator, which contains the position of the last data received through the RDMA protocol (i.e., the last data receiving position), so that the communication initiator may know from the received first handshake response that the communication receiver agrees to change the transmission protocol to the TCP protocol, and so that the communication initiator may know the data position from which the TCP protocol should start transmitting.

Step 204: Communicate, by using the TCP, with the communication receiver starting from the data corresponding to the first starting transmission position.

Based on Step 203, in this step, the above-mentioned execution body may communicate, by using the TCP, with the communication receiver starting from the data corresponding to the first starting transmission position.

The communication method applied to the communication initiator provided by embodiments of the present disclosure provide a solution for the communication initiator to switch the transmission protocol between the Remote Direct Memory Access (RDMA) protocol and the Transmission Control Protocol (TCP) according to the packet loss rate. That is, when the packet loss rate is relatively high, the TCP protocol, which can achieve more stable data transmission, is selected, and when the packet loss rate is relatively low, the RDMA protocol, which can improve the data transmission volume, is selected. Thus, the network environments of cross-cluster communication and intra-cluster communication are took into account, thereby improving the overall communication efficiency and data transmission volume, and further improving the training efficiency of the generative large-language model and shortening the training time required.

Figure 3:
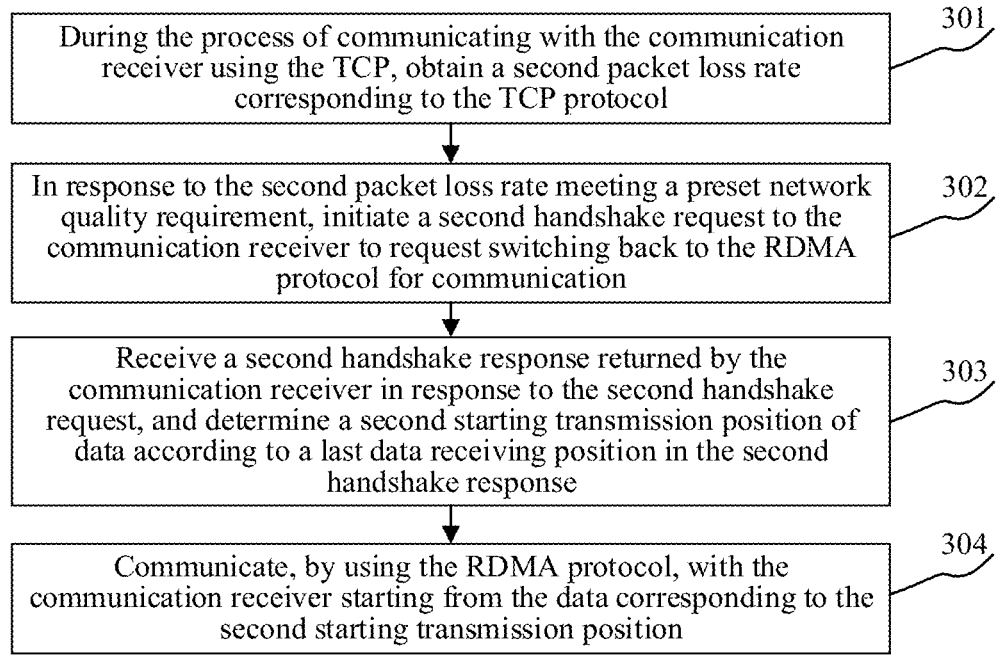
FIG. 3 is a flowchart of a communication method for switching from the TCP protocol back to the RDMA protocol provided by an embodiment of the present disclosure.

Based on the solution provided in the previous embodiments on how to switch from the RDMA protocol to the TCP protocol to cope with a poor network environment, further referring to FIG. 3. FIG. 3 is a flowchart of a communication method for switching back from the TCP protocol to the RDMA protocol provided by an embodiment of the present disclosure. The process 300 includes the following steps.

Step 301: During a process of communicating with the communication receiver using TCP, obtain the second packet loss rate corresponding to the TCP protocol.

In this step, the above-mentioned execution body may obtain the second packet loss rate corresponding to the TCP protocol during the process of communicating with the communication receiver using TCP.

The Transmission Control Protocol (TCP) is a connection-oriented, reliable, and byte-streams based transport-layer communication protocol. The TCP protocol uses flow control, acknowledgment mechanisms, and retransmission mechanisms to ensure that data is correctly and completely transmitted from the sender to the receiver.

Based on the clear concept of the packet loss rate in Step 201, the second packet loss rate described in this step refers to the packet loss rate calculated through the mechanisms of the TCP protocol when the communication initiator communicates with the communication receiver using the TCP protocol. This packet loss rate may be related to factors such as retransmission events, window size, flow control, and latency within the TCP protocol. The packet loss rate is obtained to measure the packet-loss phenomenon occurring during TCP communication, so as to evaluate the network transmission quality or adjust corresponding network parameters. Although the TCP protocol has a better ability to resist a poor network environment compared with the RDMA protocol, the quality of the current network environment may also be reflected by the size of the second packet loss rate.

An implementation method that is included but is not limited to is: the second packet loss rate is obtained from the second shared memory. In particular, the second packet loss rate is obtained by the collective communication library through calling a socket interface when using TCP, and the obtained second packet loss rate is stored into the second shared memory, which is the memory used to obtain TCP-related information therefrom.

Step 302: In response to the second packet loss rate meeting the preset network quality requirement, initiate a second handshake request to the communication receiver for requesting to switch back to the RDMA protocol for communication.

This step is based on that the packet loss rate determined in Step 301 meets the preset network quality requirement, then the above-mentioned execution body may initiate a second handshake request to the communication receiver for requesting to switch back to the RDMA protocol for communication. The preset network quality requirement is used to require that the network communication quality should be in a good state. Therefore, all parameter requirements, that may indicate that the current network environment has good network communication quality, may be regarded as the preset network quality requirement. For example, at least one of the following: the packet loss rate within a duration exceeding the first preset duration is less than the second preset packet loss rate, the packet loss rate within consecutive training operations (for example, within 3 consecutive training operations) is less than the second preset packet loss rate. The second preset packet loss rate is not greater than the first preset packet loss rate. The training operations refer to the detailed training operations in which the communication initiator initiates communication with the communication receiver for training a generative large-language model.

The second preset packet loss rate is a boundary value or critical value determined based on historical experience, for measuring whether the current network communication quality under the TCP protocol is good or poor. That is, if the actual second packet loss rate is higher than the second preset packet loss rate, it may be considered that the current network communication quality is poor. Conversely, if the actual second packet loss rate is not higher than the second preset packet loss rate, it may be considered that the current network communication quality is good. In particular, the second preset packet loss rate may be set by experts with relevant experience in combination with the actual situation in a specific application scenario, or the second preset packet loss rate may be obtained by analyzing the input samples representing the current application scenario through a pre-trained model. There is no specific limitation here. More particularly, the second preset packet loss rate may also be set to 4%.

Since when the second packet loss rate meets the preset network quality requirement, it means that the execution body is in a network environment with good network communication quality during the current period of communicating with the communication receiver using the TCP protocol. Therefore, in order to make full use of the good network communication quality to increase the amount of data transmitted per unit time as much as possible and thus improve the efficiency of the overall training task, the above-mentioned execution body may initiate a second handshake request to the communication receiver in this step, indicating the intention to switch the current TCP protocol to the RDMA protocol, which can bring a greater throughput of data transmitted per unit time in a good network environment. That is, this second handshake request is used to inform the communication receiver that the communication initiator intends to switch the communication protocol and intends to switch to the RDMA protocol.

Step 303: Receive the second handshake response returned by the communication receiver for the second handshake request, and determine the second starting transmission position of data according to the last data receiving position in the second handshake response.

In this step, the above-mentioned execution body may receive a second handshake response returned by the communication receiver for the second handshake request, and determine a second starting transmission position of data according to the last data receiving position in the second handshake response. That is, after receiving the second handshake request sent by the above-mentioned execution body, the communication receiver parses the second handshake request and learns that the communication initiator intends to change the data transmission protocol used for subsequent data transmission, and specifically change to using the RDMA protocol. Accordingly, when the communication receiver also supports the RDMA protocol, the communication receiver may return a second handshake response to the communication initiator, which contains the position of the last data received through the TCP protocol (i.e., the last data receiving position), so that the communication initiator may know from the received second handshake response that the communication receiver agrees to change the transmission protocol to the RDMA protocol, and so that the communication initiator may know the data position from which the RDMA protocol should start transmitting.

Step 304: Communicate, by using the RDMA protocol, with the communication receiver starting from the data corresponding to the second starting transmission position.

Based on Step 303, the above-mentioned execution body may communicate, by using the RDMA protocol, with the communication receiver starting from the data corresponding to the second starting transmission position.

That is, through Steps 301-304, this embodiment provides an implementation solution for how to switch from the TCP protocol back to the RDMA protocol. When it is found that the second packet loss rate meets the preset network quality requirement, it is confirmed that the current network environment is excellent. Therefore, switching back to the RDMA protocol is chose, to make more full use of the excellent network environment to transmit more data per unit time.

In fact, the transmission protocol switching strategy provided by the above-mentioned embodiments is not selectively applied according to the communication type (i.e., intra-cluster communication or cross-cluster communication). Both communication types may actually adopt this switching strategy. That is, this switching strategy may be configured for the communication initiator within each computing power cluster, and there is no need to select different switching strategies according to the communication type. However, considering that it is actually rare for a poor network environment to occur in intra-cluster communication and thus resulting in a large packet loss rate corresponding to the RDMA protocol, it may also actually configure the above-mentioned switching strategy only for cross-cluster communication.

Figure 4:
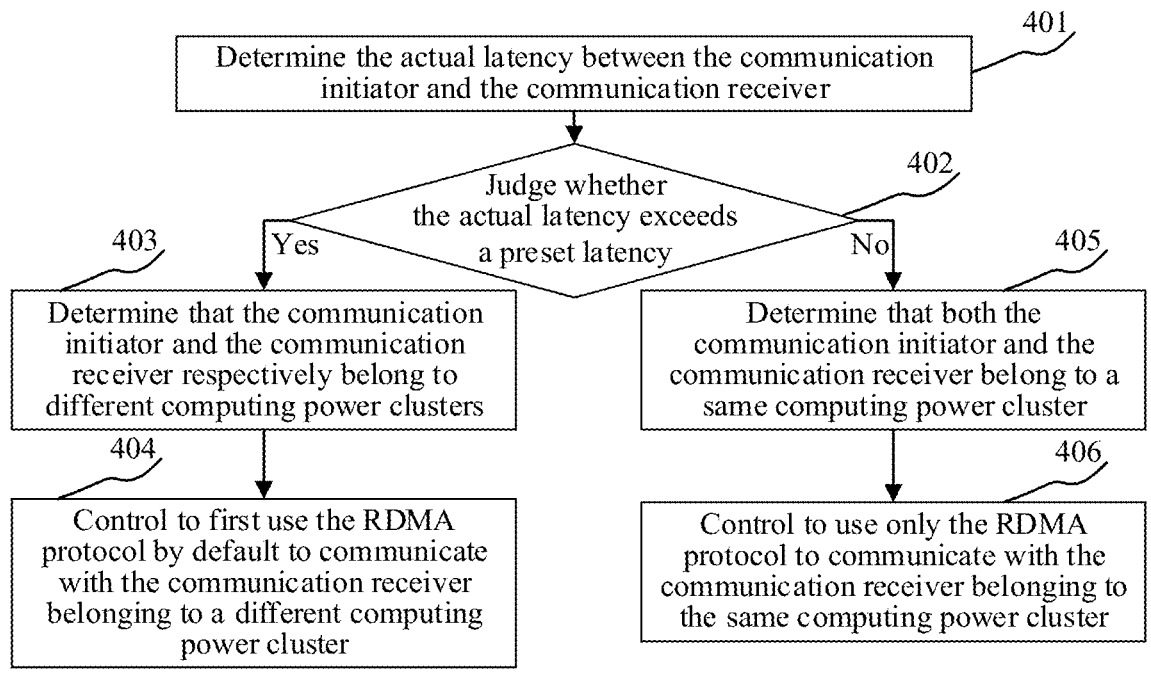
FIG. 4 is a flowchart of a determination and processing method for determining whether the communication initiator and the communication receiver belong to different computing power clusters according to the actual latency provided by an embodiment of the present disclosure.

On this basis, to deepen the understanding of how to determine whether the communication initiator and the communication receiver belong to different computing power clusters, FIG. 4 is referred. FIG. 4 is a flowchart of a determination and processing method for determining whether the communication initiator and the communication receiver belong to different computing power clusters according to the actual latency provided by an embodiment of the present disclosure. The process 400 includes the following steps:

Step 401: Determine the actual latency between the communication initiator and the communication receiver.

In this step, the above executing body may determine the actual latency between the communication initiator and the communication receiver. An implementation, including but not limited to, may be as follows.

First, determining a moment when the communication initiator sends out data to the communication receiver as a start moment; then, determining a moment when an acknowledgement notice, which is returned by the communication receiver after receiving the data, is received as an end moment; and finally, calculating to obtain the actual latency, based on the start moment and the end moment.

Further, in order to ensure the accuracy of the calculated actual latency, a preset number of start-end time pairs composed of start moments and corresponding end moments may also be selected, that is, latency values corresponding to the start-end time pairs are calculated to obtain a latency set, and then the actual latency served by an average latency is obtained by calculating an average of the latency values in the latency set, so as to eliminate accidental or fluctuating errors using the averaging method.

Step 402: Judge whether the actual latency exceeds a preset latency. If yes, step 403 is executed, otherwise step 405 is executed.

In this step, the above executing body is enabled to compare the actual latency with the preset latency, and to execute different subsequent processing branches based on the two comparison results. In the present embodiment, the preset latency serves as a latency boundary value between higher latency and lower latency. Here, the higher latency corresponds to cross-cluster communication latency, while the lower latency corresponds to intra-cluster communication latency.

Step 403: Determine that the communication initiator and the communication receiver belong to different computing power clusters.

This step is established on the basis that the determination result in step 402 is that the actual latency exceeds the preset latency, and aims to determine by the above executing body that the communication initiator and the communication receiver respectively belong to the different computing power clusters.

The different computing power clusters described in an embodiment of the present disclosure mainly refer to computing power clusters for training generative large language model(s), composed of graphical processors located in different machine rooms at different locations, respectively. If different machine rooms are directly classified as different computing power clusters, different computing power clusters may be simply understood as different machine rooms, i.e., the cross-cluster communication may also be adaptively understood as cross-machine room communication.

Step 404: Control to default to first use the RDMA protocol to communicate with the communication receiver belonging to a different computing power cluster.

Based on Step 403, the purpose is for the above-mentioned execution body to control to default to first use the RDMA protocol to communicate with the communication receiver belonging to a different computing power cluster. That is, the cross-cluster communication is configured to adopt the switching strategy provided by the above-mentioned embodiment, and set to default to first use the RDMA protocol. Only when a high packet loss rate occurs during the use of the RDMA protocol may it be switched to the TCP protocol.

Step 405: Determine that the communication initiator and the communication receiver both belong to the same computing power cluster.

This step is based on the judgment result in Step 402 that the actual latency does not exceed the preset latency. The purpose is for the above-mentioned execution body to determine that the communication initiator and the communication receiver both belong to the same computing power cluster.

In contrast to different computing power clusters mainly referring to computing power clusters for training generative large language model(s), composed of graphical processors located in different machine rooms at different locations respectively, the same computing power cluster may refer to a computing power cluster for training generative large language model(s), composed of graphical processors located in the same machine room at the same location. Similarly, if different computing power clusters may be simplified as different machine rooms, the computing power cluster may also be simplified as the same one machine room.

Step 406: Control to only use the RDMA protocol to communicate with the communication receiver belonging to the same computing power cluster.

Based on Step 405, the purpose of this step is for the above-mentioned execution body to control the communication initiator in intra-cluster communication to only use the RDMA protocol to communicate with the communication receiver belonging to the same computing power cluster. That is, the above-mentioned switching strategy is not configured for the devices in intra-cluster communication, so that the devices in intra-cluster communication can only use the RDMA protocol for data communication. This is a solution given based on the actual situation that intra-cluster communication rarely encounters a poor internal network environment that affects the communication effect within the cluster.

Of course, in the case of intra-cluster communication type, a transmission protocol provided by the existing collective communication library may also be directly used for data communication. NVIDIA Collective Communications Library (NCCL), is an efficient communication library developed by NVIDIA, is primarily designed to accelerate collective communication operations in deep learning frameworks. It is widely applied in distributed training scenarios, particularly in multi-GPU or multi-node environments. NCCL focuses on delivering high-performance communication protocols and algorithms, and aims to leveraging GPU hardware acceleration to significantly improve data transmission speed and parallel computing efficiency.

NCCL provides a variety of common collective communication operations for distributed training, which are typically used to synchronize and share data across multiple computing nodes. Common collective communication operations in deep learning training include the following.

1) AllReduce: exchanges data across multiple nodes and aggregates the data (e.g., summation, averaging). In deep learning, it is commonly used for gradient synchronization in distributed training.

2) Broadcast: transmits data from one node to all other nodes. It is typically used to synchronize model parameters or other shared data to individual nodes.

3) AllGather: collects and aggregates data from multiple nodes to all nodes. It is used for input aggregation in distributed training of data.

4) Reduce: exchanges data across multiple nodes and aggregates the data, usually aggregates data from multiple nodes to a single node.

5) ReduceScatter: aggregates data from multiple nodes and distributes data to individual nodes. Complementary with AllGather.

The following advantages may be realized by using NCCL.

1) Hardware acceleration: NCCL fully leverages NVIDIA's hardware characteristics such as NVLink (for high-bandwidth GPU-to-GPU communication), or NVIDIA RDMA, to provide extremely high bandwidth and low-latency communication.

2) Multi-GPU support: specifically designed for GPUs, NCCL supports single-node, multi-GPU configurations and cross-node distributed training, can effectively improve training efficiency.

3) Efficient algorithms: NCCL implements a variety of optimized communication algorithms tailored to different network topologies and hardware characteristics, to minimize communication bottlenecks.

4) Ease of use and compatibility: NCCL provides easy-to-integrate API interfaces that work seamlessly with popular deep learning frameworks. Its straightforward API design allows users to focus on application-layer logic without worrying about underlying communication implementations.

5) Cross-platform support: NCCL supports a variety of Linux systems, as well as GPU hardware in CUDA environments, adapting to diverse multi-GPU configurations.

In addition, NCCL is adopted as the default communication library by multiple deep learning frameworks (e.g., TensorFlow, PyTorch, MXNet) to accelerate communication between multi-GPUs or to accelerate communication during distributed training. In particular, these frameworks invoke NCCL to handle tasks such as gradient synchronization and model parameter broadcasting. In this way, the frameworks enable efficient distributed training, particularly in scenarios involving using multiple GPUs. For example, torch.distributed module in PyTorch provides integration with NCCL, which may be configured to specify a communication backend as NCCL for performing efficient communication operations in multi-GPU environments.

Through Steps 401-406, a method is provided to determine whether it is intra-cluster communication or cross-cluster communication based on the actual latency between the two communication ends, and a corresponding method for determining and matching a transmission-protocol switching strategy and configuration is provided for each of the two different communication types. Then, different types of communications are carried out based on the different protocol-switching strategies to ultimately improve the overall communication efficiency and data throughput.

In addition to determining whether it is intra-cluster communication or cross-cluster communication according to the actual latency in the previous embodiment, whether it is intra-cluster communication or cross-cluster communication may also be determined according to the packet loss rate. For example, if the first packet loss rate is lower than the first preset packet loss rate within the second preset duration, that the communication initiator and the communication receiver both belong to the same computing power cluster may be determined. Then, the above-mentioned execution body may also control to only use the RDMA protocol to communicate with the communication receiver belonging to the same computing power cluster.

To enhance understanding, embodiments of the present disclosure are also elaborated in detail in combination with specific application scenarios, covering aspects such as the problems existing in the scenarios, the approach to solve these problems, and the detailed implementation plan.

With the increasing demand for computing power in the era of large models, the requirement for the number of chips within a cluster is getting higher and higher. A single cluster with thousands or even tens of thousands of cards may no longer meet the demand. As a result, the training on basis of larger-scale clusters in the future has to rely on the joint efforts of multiple computing power clusters. These clusters are usually distributed in different physical locations, and may even span regions. How to make efficient use of these clusters and minimize the significant impact of cross-machine-room communication time on training performance has become a hot topic in the industry.

Figures 1, 5:
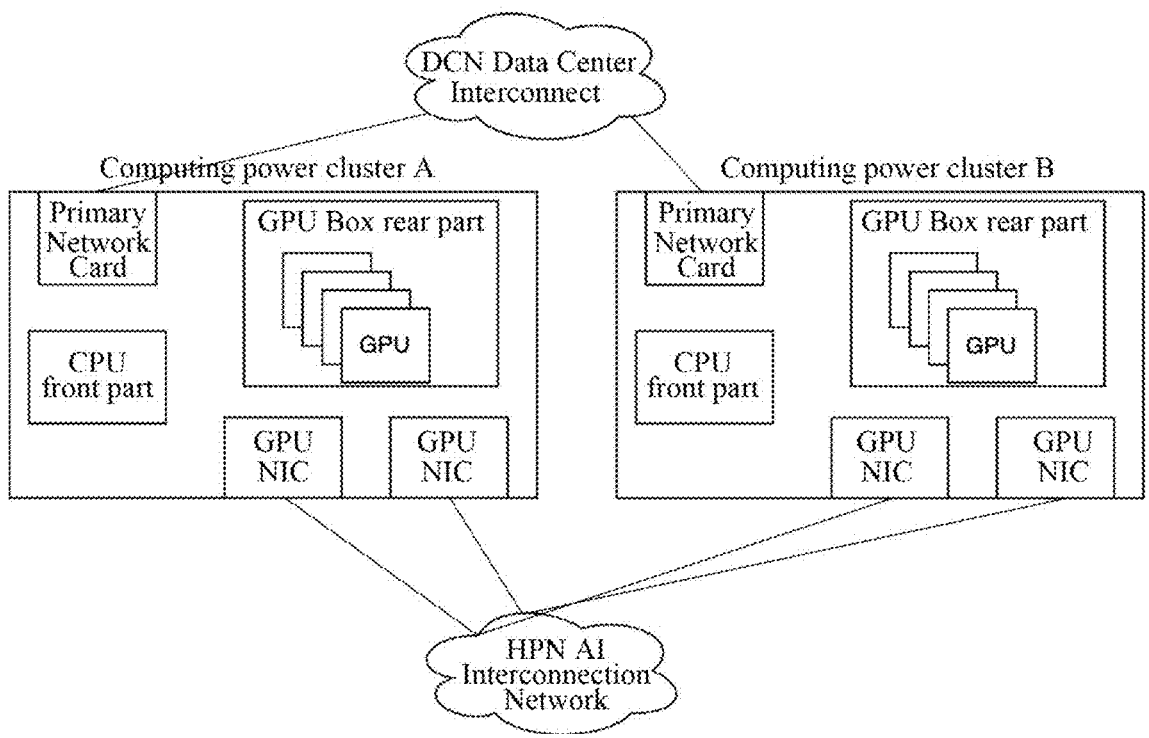
Figures 2, 5:
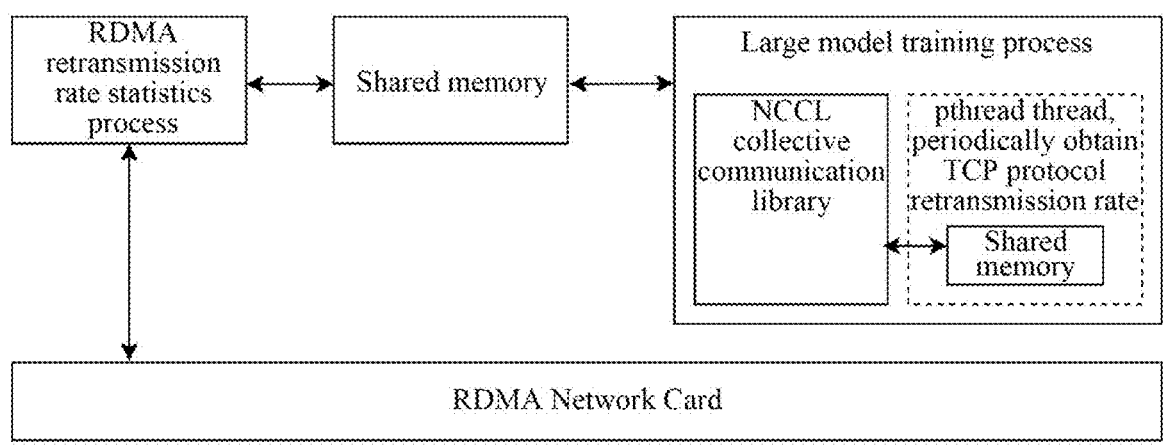
Figures 3, 5:
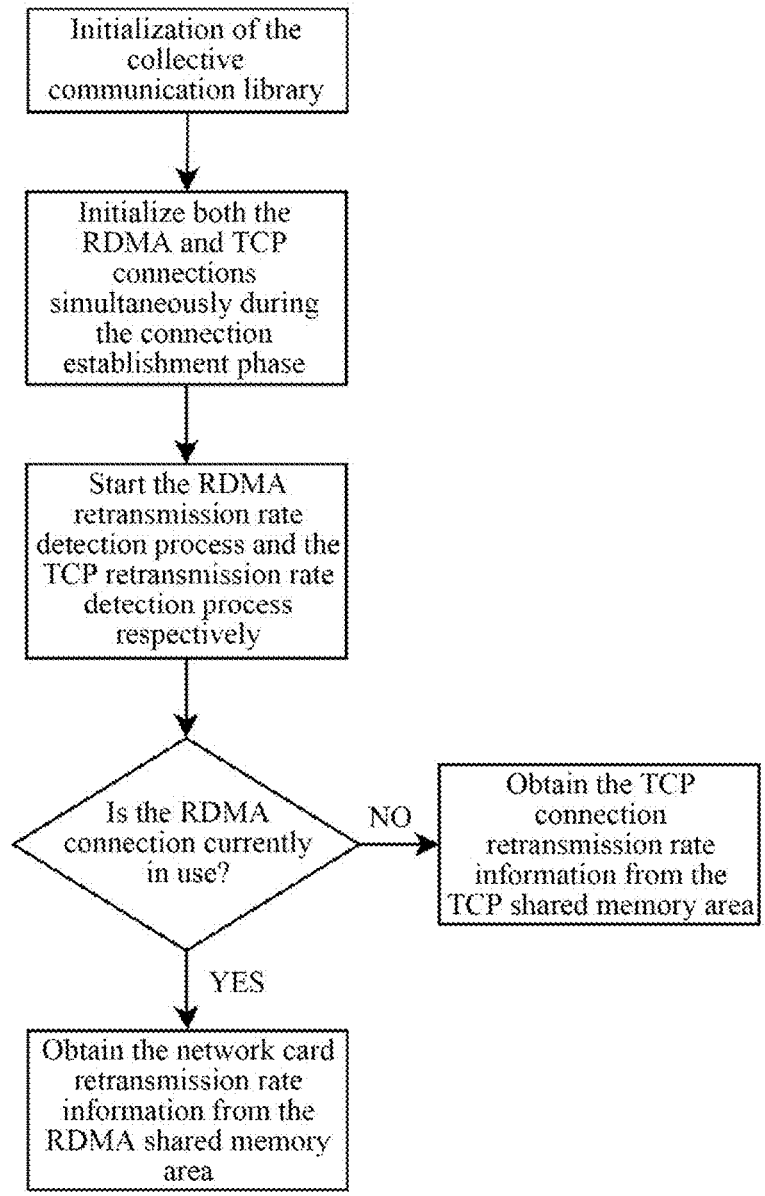
Figures 4, 5:
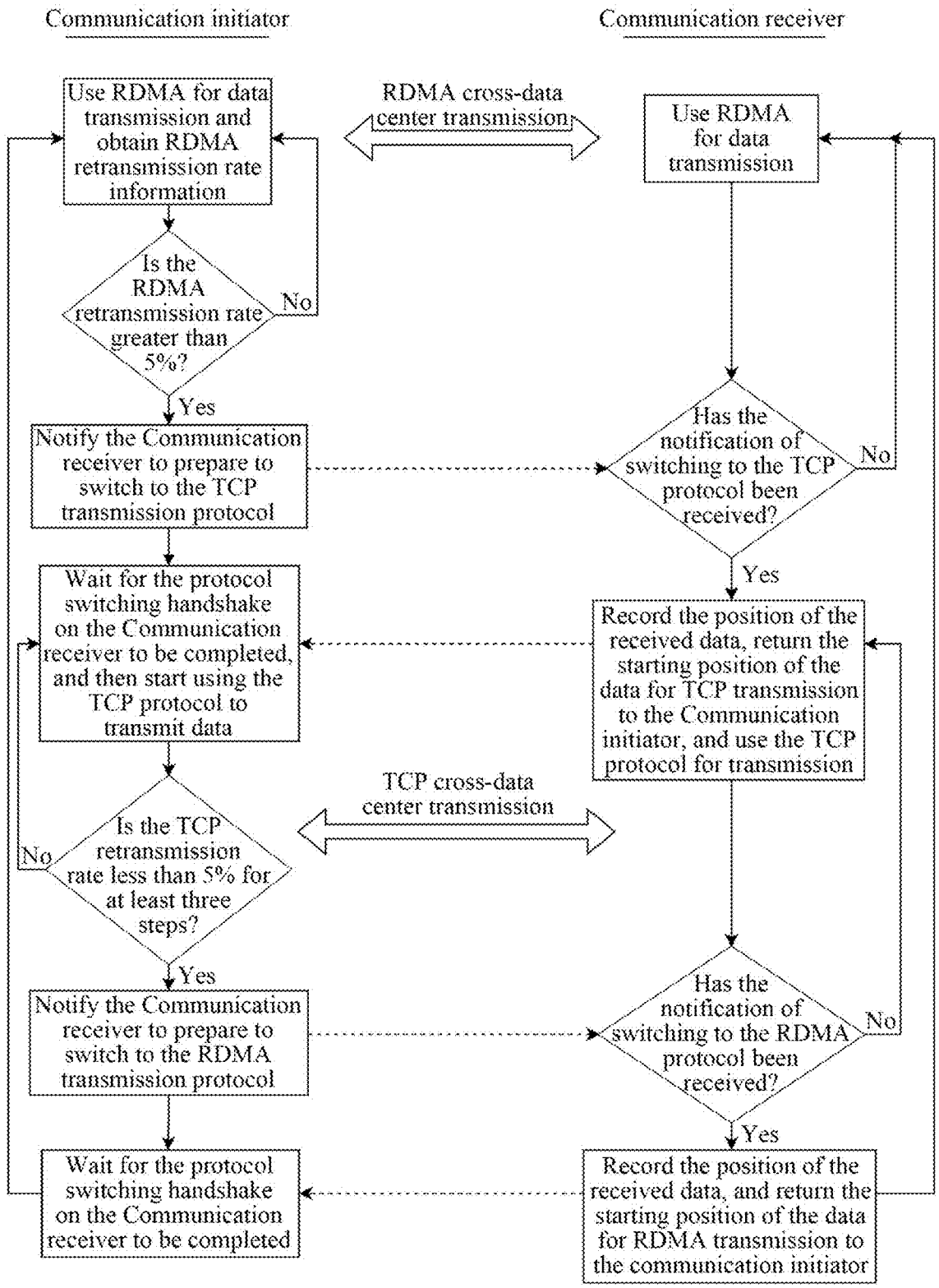

Typically, a GPU server is equipped with multiple GPU network interface cards (i.e., Graphics Processing Unit Network Interface Card, a hardware device that combines GPU(s) and network interface card(s), which integrates traditional network communication functions with powerful parallel computing capabilities, and is commonly used in fields such as high-performance computing, artificial intelligence, and big-data analysis; compared with traditional network cards, GPU network interface cards can perform parallel computing while transmitting data, significantly improving the efficiency and speed of data processing, especially when dealing with large amounts of data and complex operations). GPU network interface cards are responsible for the cross-machine traffic transmission between GPUs. At the same time, a main network interface card is also configured to meet the basic outbound network requirements such as server management, accessing cloud services, storage, etc. There are two possible ways for the interconnection between data-center clusters, as shown in FIG. 5-1. One way is to lay a dedicated line to connect the High Performance Networking (HPN) AI networks in different clusters. This method may build a relatively large interconnection bandwidth according to actual needs to meet requirements, and good performance can be obtained after optimizing the long-distance cross-machine-room transmission efficiency of RDMA, but the construction cost is relatively high. The other way is to directly reuse the Data Center Network (DCN). Using DCN does not require additional construction costs, but the cross-machine-room DCN bandwidth is not guaranteed. This bandwidth is shared and cannot be ensured to be exclusively used for a model training. Therefore, the network quality is also not guaranteed.

For most personnel related to model training, they usually prefer to reuse the existing infrastructure first. Therefore, without incurring additional construction costs, they usually choose the solution of reusing the DCN network to connect multiple computing power clusters. In this scenario, the model usually adopts pipeline parallelism, that is, the model is split to different machine rooms by pp (Point-to-Point) strategy. The reason is that pp transmission can be overlapped (referring to the situation where data streams or signals can be transmitted overlappingly on the same transmission medium, and by ingenious technical means, data streams or signals can be ensured not to interfere with each other, and bandwidth and transmission resources can be effectively utilized). When the pp transmission performance is not too poor, it can be concealed by the computing process. In this case, there may be two scenarios for pp transmission: one is pp transmission within the computing power cluster, and the other is pp transmission across machine rooms. The communication for large-model training may use the RDMA of the collective communication library NCCL for transmission. However, since the cross-machine-room DCN network is shared and the bandwidth is not guaranteed, there may be more packet losses during peak periods, resulting in poor RDMA transmission. At this time, choosing RDMA for transmission is no longer a suitable option, and it may degrade to the TCP protocol for transmission. But for the two scenarios of within-machine-room and cross-machine-room, using RDMA is usually better for the former, and for the latter, there is a question of whether it is better to choose the TCP protocol or the RDMA protocol, the current collective communication library NCCL cannot automatically select, and can only be pre-configured with a fixed parameter, which is unable to adapt to both scenarios simultaneously.

Therefore, this embodiment may achieve the following key functions to overcome the deficiencies of the prior art.

1) Be able to obtain the transmission packet-loss rate index in both RDMA transmission and TCP transmission scenarios;

2) How to achieve automatic switching between the two transmission protocols in the collective communication library.

That is, this embodiment aims to provide a solution for self-adaptively adjusting the transmission protocol. The communication library may automatically configure whether to use RDMA transmission or TCP transmission based on information such as link bandwidth, latency, and packet-loss rate. This is especially suitable for scenarios of mixed training at different locations where there are within-machine-room and cross-machine-room pp transmissions, and the cross-machine-room bandwidth and network quality cannot be guaranteed, thus solving the technical problem that current related solutions only support static configuration and can only adapt to a single scenario, lacking flexibility. The following will describe detailed implementation means in detail.

I) Packet-Loss Rate Detection. The result of packet-loss rate detection is very important for determining whether to use RDMA for transmission. Generally, the cross-machine-room DCN network is not configured with PFC (Priority Flow Control), etc., and cannot ensure that RDMA transmission is in a lossless (minimum-loss) environment without packet loss. The existing collective communication library, whether using TCP or RDMA, does not consider the link quality issue and thus does not have the function of link packet-loss rate detection. In this embodiment, packet-loss rate detection modules are designed for both RDMA transmission and TCP transmission scenarios. The collective communication library NCCL may acquire the packet-loss rate situations of RDMA and TCP through the packet-loss rate detection modules. The detailed acquisition method can be seen in FIG. 5-2.

That is, for RDMA, since the collective communication library uses the verbs interface to perform data sending and receiving operations of the RDMA network interface card internally, and there is no dedicated verbs interface to specifically acquire packet-loss information, this embodiment may specifically create a process for counting the RDMA re-transmission rate to acquire the re-transmission statistical information of the network interface card. This information may be obtained from the register of the network interface card. The RDMA re-transmission rate counting process may periodically obtain this data from the register and store it into the shared memory of the server. The collective communication library NCCL in the large-model training process may also periodically access the shared memory to read the re-transmission rate data of the RDMA network interface card.

For TCP, the NCCL collective communication library may directly use a relevant socket interface of TCP to obtain the number of re-transmitted packets and the total number of sent data packets, so there is no need for an additional process to obtain this information.

The process flow of the collective communication library in this embodiment obtaining the re-transmission rates of RDMA and TCP is shown in FIG. 5-3. Because there is a switch between the RDMA connection and the TCP connection, during the initialization phase, the collective communication library may establish both the RDMA connection and the TCP connection simultaneously, rather than just one of them. After completing the connection-establishment process, the RDMA re-transmission rate detection process and the TCP connection re-transmission rate detection thread may be started respectively, which may continuously obtain the re-transmission rate information by reading the network interface card register and the relevant function interfaces of the Socket, and the obtained information may be used as the basis for subsequent transmission protocol switching.

Whether to read the re-transmission rate information of RDMA or TCP depends on which transmission protocol is currently in use, so the shared-memory areas of the two transmission protocols will not be read simultaneously.

II) Switching the RDMA/TCP Transmission Protocol According to Packet-Loss Rate Information. Cross-machine-room transmission is usually the pp transmission in large-model training, during this process, the sender and the receiver may preferentially use the RDMA protocol for transmission. That is, assuming that the cross-machine-room DCN network bandwidth is sufficient and the network quality is good, the RDMA transmission protocol is tried first. The subsequent process is mainly divided into two steps.

1) Switching from the RDMA protocol to the TCP protocol. The sender of pp transmission may continuously detect the re-transmission rate of RDMA. If the re-detected transmission rate exceeds 5%, which usually has a significant impact on the transmission performance of RDMA, a protocol switch may be triggered. Since both sides need to be aware of the protocol-switching process, there is a handshake process here: the sender may send a control signal to the receiver, informing the receiver to prepare for protocol switching; the receiver may record the position of the currently received data and inform the sender of this position through a second handshake. After receiving the position, the sender may know from where to start transmitting data after switching to the TCP protocol. Thereafter, the TCP protocol may be used for data transmission.

2) Switching back from the TCP protocol to the RDMA protocol for transmission. Switching to the TCP protocol is to avoid a significant decline in performance that may have a large impact on model training when the DCN network quality is poor. This process usually occurs during peak periods. If it is off-peak and there is not much business traffic sharing, the network bandwidth recovers and the packet-loss rate decreases, then RDMA transmission may be restored. At this time, to avoid oscillation, the packet-loss rate of three model-training steps may be continuously observed. If the observed TCP packet-loss rate does not exceed 5% in all the three training steps, it indicates that the network quality has recovered, and it is ready to notify the receiver to switch back to RDMA transmission. The process is the similar as the process of switching to TCP: a handshake process may be initiated to negotiate the data-transmission position, and RDMA may be used for transmission after the negotiation is completed.

The complete switching strategy provided by the above-mentioned complete solution may be referred to in the process schematic diagram shown in FIG. 5-4, which presents both the communication initiator and the communication receiver.

Figure 6:
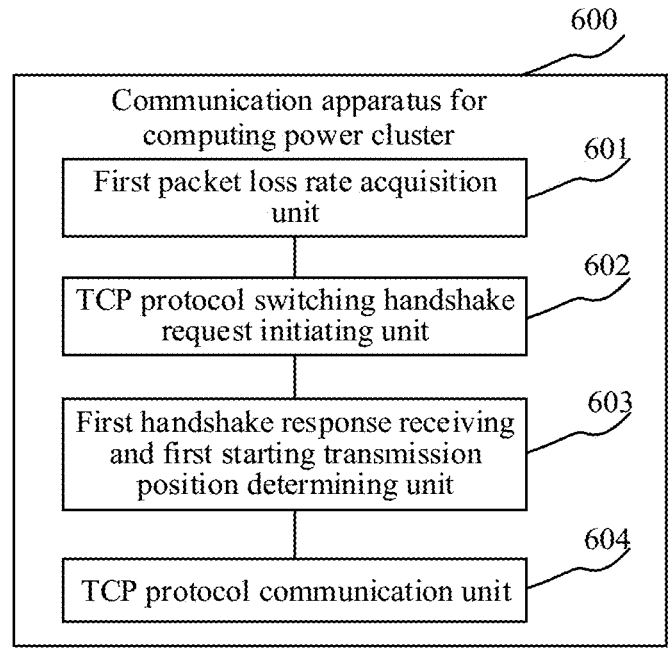
FIG. 6 is a structural block diagram of a communication apparatus provided by an embodiment of the present disclosure.

Further referring to FIG. 6, as an implementation of the method shown in each of the above figures, an embodiment of the present disclosure provides a communication apparatus for computing power cluster, which corresponds to the method embodiment shown in FIG. 2, and the apparatus is particularly applicable to various electronic devices.

As shown in FIG. 6, the communication apparatus 600 for computing power cluster of the present embodiment may include: a first packet loss rate acquisition unit 601, a TCP protocol switching handshake request initiating unit 602, a first handshake response receiving and first starting transmission position determining unit 603, and a TCP protocol communication unit 604. The first packet loss rate acquisition unit 601 is configured to, obtain a first packet loss rate corresponding to Remote Direct Memory Access (RDMA) protocol during a process of communicating with a communication receiver using the RDMA protocol. The TCP protocol switching handshake request initiating unit 602 is configured to initiate a first handshake request to the communication receiver for requesting to switch to Transmission Control Protocol (TCP) for communication in response to the first packet loss rate being higher than a first preset packet loss rate. The first handshake response receiving and first starting transmission position determining unit 603 is configured to receive a first handshake response returned by the communication receiver for the first handshake request, and determine a first starting transmission position of data according to a last data receiving position in the first handshake response. The TCP protocol communication unit 604 is configured to communicate, by using the TCP, with the communication receiver starting from data corresponding to the first starting transmission position.

In the present embodiment, in the communication apparatus 600 for computing power cluster, the detailed processing and the technical effects of the first packet loss rate acquisition unit 601, the TCP protocol switching handshake request initiating unit 602, the first handshake response receiving and first starting transmission position determining unit 603, and the TCP protocol communication unit 604 may be described with reference to the related description of steps 201-204 in the corresponding embodiment of FIG. 2, and detailed description thereof will be omitted.

In some alternative implementations of the present embodiment, the first packet loss rate acquisition unit 601 is further configured to: obtain the first packet loss rate from a first shared memory corresponding to an RDMA network interface card; wherein the first packet loss rate is obtained from a register of the RDMA network interface card by a first packet loss rate acquisition process and is stored into the first shared memory, the first packet loss rate acquisition process is started when communicating using the RDMA protocol.

In some alternative implementations of the present embodiment, the communication apparatus 600 further includes: a second packet loss rate acquisition unit, which is configured to obtain a second packet loss rate corresponding to the TCP protocol during a process of communicating with the communication receiver using the TCP; an RDMA protocol switching handshake request initiating unit, which is configured to initiate a second handshake request to the communication receiver for requesting to switch back to the RDMA protocol for communication in response to the second packet loss rate meeting a preset network quality requirement; a second handshake response receiving and second starting transmission position determining unit, which is configured to receive a second handshake response returned by the communication receiver for the second handshake request, and determine a second starting transmission position of data according to a last data receiving position in the second handshake response; an RDMA protocol communication unit, which is configured to communicate, by using the RDMA protocol, with the communication receiver starting from data corresponding to the second starting transmission position.

In some alternative implementations of the present embodiment, the second packet loss rate acquisition unit is further configured to: obtain the second packet loss rate from a second shared memory; wherein the second packet loss rate is obtained by a collective communication library through calling a socket interface when using the TCP and is stored into the second shared memory.

In some alternative implementations of the present embodiment, the preset network quality requirement includes at least one of the following: a packet loss rate within a duration exceeding a first preset duration is less than a second preset packet loss rate, and a packet loss rate within consecutive plurality of training operations is less than the second preset packet loss rate; wherein the second preset packet loss rate is not greater than the first preset packet loss rate.

In some alternative implementations of the present embodiment, the communication apparatus 600 further includes: a different computing power cluster belonging determination unit, configured to determine that the communication initiator and the communication receiver belong to different computing power clusters in response to an actual latency between the communication initiator and the communication receiver exceeding a preset latency; and a first control unit, configured to control to default to first use the RDMA protocol to communicate with the communication receiver belonging to a different computing power cluster.

In some alternative implementations of the present embodiment, the communication apparatus 600 further includes an actual latency calculation unit, and the actual latency calculation unit includes: a start moment determining subunit, configured to determine a moment when the communication initiator sends out data to the communication receiver as a start moment; an end moment determining subunit, configured to determine a moment when an acknowledgement notice is received as an end moment, the acknowledgement notice is returned by the communication receiver after receiving the data; and an actual latency calculating subunit, configured to calculate to obtain the actual latency based on the start moment and the end moment.

In some alternative implementations of the present embodiment, the actual latency calculating subunit is further configured to: calculate latency values corresponding to a preset number of start-end time pairs composed of start moments and corresponding end moments, to obtain a latency set; and calculate an average of the latency values in the latency set to obtain the actual latency.

In some alternative implementations of the present embodiment, the communication apparatus 600 further includes: a first same computing power cluster belonging determination unit, configured to determine that the communication initiator and the communication receiver both belong to a same computing power cluster in response to the actual latency between the communication initiator and the communication receiver not exceeding the preset latency; and a second control unit, configured to control to only use the RDMA protocol to communicate with the communication receiver belonging to the same computing power cluster.

In some alternative implementations of the present embodiment, the communication apparatus 600 further includes: a second same computing power cluster belonging determination unit, configured to determine that the communication initiator and the communication receiver both belong to a same computing power cluster in response to the first packet loss rate being lower than the first preset packet loss rate within a second preset duration; and a third control unit, configured to control to only use the RDMA protocol to communicate with the communication receiver belonging to the same computing power cluster.

In some alternative implementations of the present embodiment, the different computing power clusters include: computing power clusters for training a generative large language model, composed of graphical processors located in different machine rooms at different locations, respectively; correspondingly, the same computing power cluster comprises: a computing power cluster for training the generative large language model, composed of graphical processors located in a same machine room at a same location.

This embodiment exists as an apparatus embodiment corresponding to the above-mentioned method embodiment. The communication apparatus for a computing power cluster provided in this embodiment offers a solution for the communication initiator to switch the transmission protocol between the Remote Direct Memory Access (RDMA) protocol and the Transmission Control Protocol (TCP) based on the packet loss rate. When the packet loss rate is relatively high, the TCP protocol, which can achieve more stable data transmission, is selected. When the packet loss rate is relatively low, the RDMA protocol, which can improve the data transmission volume, is chosen. Thus, the network environments of cross-cluster communication and intra-cluster communication are took into account, thereby improving the overall communication efficiency and data transmission volume. Consequently, the training efficiency of the generative large-language model is enhanced, and the time required for training is shortened.

According to an embodiment of the present disclosure, an electronic device is provided, the electronic device including: at least one processor; and a memory communicatively connected to the at least one processor; where, the memory stores instructions executable by the at least one processor, and the instructions, when executed by the at least one processor, cause the at least one processor to perform the communication method for computing power cluster described in any one of the above embodiments.

According to an embodiment of the present disclosure, a readable storage medium is provided, the readable storage medium storing computer instructions, where, the computer instructions are used to cause the computer to perform the communication method for computing power cluster described in any one of the above embodiments.

According to an embodiment of the present disclosure, a computer program product is provided, including a computer program, the computer program, when executed by a processor, implements communication method for computing power cluster described in any one of the above embodiments.

Figure 7:
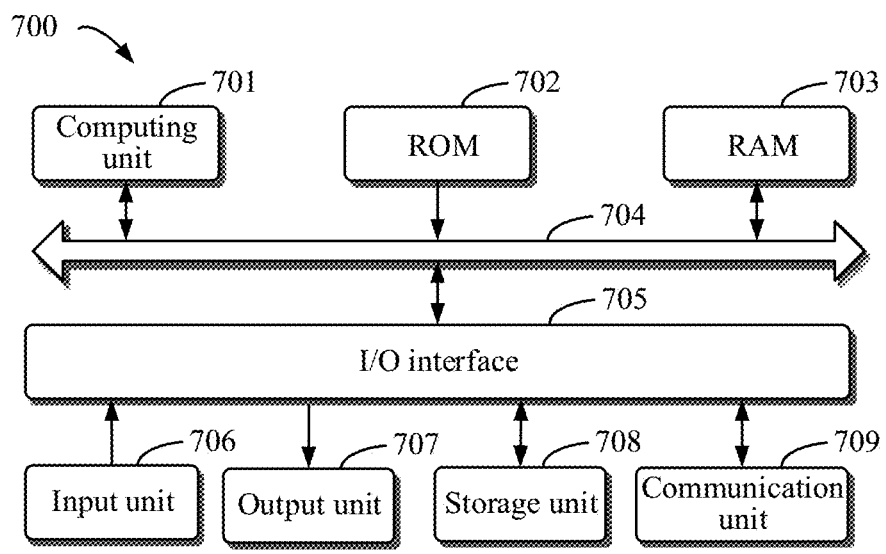
FIG. 7 is a structural schematic diagram of an electronic device suitable for executing the communication method provided by an embodiment of the present disclosure.

FIG. 7 shows a schematic block diagram of an example electronic device 700 that may be configured to implement embodiments of the present disclosure. The electronic device is intended to represent various forms of digital computers, such as a laptop, a desktop computer, a workbench, a personal digital assistant, a server, a blade server, a mainframe computer, and other suitable computers. The electronic device may also represent various forms of mobile apparatuses, such as a personal digital assistant, a cellular phone, a smart phone, a wearable device, and other similar computing apparatuses. The components shown herein, the connections and relationships thereof, and the functions thereof are used as examples only, and are not intended to limit implementations of the present disclosure described and/or claimed herein.

As shown in FIG. 7, the device 700 includes a computing unit 701, which may execute various appropriate actions and processes in accordance with a computer program stored in a read-only memory (ROM) 702 or a computer program loaded into a random-access memory (RAM) 703 from a storage unit 708. The RAM 703 may further store various programs and data required by operations of the device 700. The computing unit 701, the ROM 702, and the RAM 703 are connected to each other through a bus 704. An input/output (I/O) interface 705 is also connected to the bus 704.

A plurality of components in the device 700 is connected to the I/O interface 705, including: an input unit 706, such as a keyboard and a mouse; an output unit 707, such as various types of displays and speakers; the storage unit 708, such as a magnetic disk and an optical disk; and a communication unit 709, such as a NIC, a modem, and a wireless communication transceiver. The communication unit 709 allows the device 700 to exchange information/data with other devices via a computer network such as the Internet and/or various telecommunication networks.

The computing unit 701 may be various general-purpose and/or dedicated processing components having processing and computing capabilities. Some examples of the computing unit 701 include, but are not limited to, central processing unit (CPU), graphics processing unit (GPU), various dedicated artificial intelligence (AI) computing chips, various computing units running machine learning model algorithms, digital signal processors (DSP), and any appropriate processors, controllers, microcontrollers, etc. The computing unit 701 performs the various methods and processes described above, such as the communication method for computing power cluster. For example, in some embodiments, the communication method for computing power cluster may be implemented as a computer software program, which is tangibly included in a machine readable medium, such as the storage unit 708. In some embodiments, part or all of the computer program may be loaded and/or installed on the device 700 via the ROM 702 and/or the communication unit 709. When the computer program is loaded into the RAM 703 and executed by the computing unit 701, one or more steps of the communication method for computing power cluster described above may be performed. Alternatively, in other embodiments, the computing unit 701 may be configured to perform the communication method for computing power cluster by any other appropriate means (for example, by means of firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a specific-purpose or general-purpose programmable processor, which may receive data and instructions from a storage system, at least one input device and at least one output device, and send the data and instructions to the storage system, the at least one input device and the at least one output device.

Program codes used to implement the method of embodiments of the present disclosure may be written in any combination of one or more programming languages. These program codes may be provided to a processor or controller of a general-purpose computer, specific-purpose computer or other programmable data processing apparatus, so that the program codes, when executed by the processor or controller, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more specific example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The Server could be a cloud server, also known as cloud computing server or cloud host, which is a host product in the cloud computing service system to solve the defects of difficult management and weak business scalability in the traditional physical host and Virtual Private server (VPS, Virtual Private Server) service. The server may also be classified as distributed system servers, or a server that combines a blockchain.

According to the technical solution of embodiments of the present disclosure, a solution for the communication initiator to switch the transmission protocol between the Remote Direct Memory Access (RDMA) protocol and the Transmission Control Protocol (TCP) according to the packet loss rate, is provided. That is, when the packet loss rate is relatively high, the TCP protocol, which can achieve more stable data transmission, is selected, and when the packet loss rate is relatively low, the RDMA protocol, which can improve the data transmission volume, is selected. Thus, the network environments of cross-cluster communication and intra-cluster communication are took into account, thereby improving the overall communication efficiency and data transmission volume, and further improving the training efficiency of the generative large-language model and shortening the training time required.

It should be appreciated that the steps of reordering, adding or deleting may be executed using the various forms shown above. For example, the steps described in embodiments of the present disclosure may be executed in parallel or sequentially or in a different order, so long as the expected results of the technical schemas provided in embodiments of the present disclosure may be realized, and no limitation is imposed herein.

The above specific implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A communication method for a computing power cluster, applied to a communication initiator, comprising:
   during a process of communicating with a communication receiver using Remote Direct Memory Access (RDMA) protocol, obtaining a first packet loss rate corresponding to the RDMA protocol;
   in response to the first packet loss rate being higher than a first preset packet loss rate, initiating a first handshake request to the communication receiver for requesting to switch to Transmission Control Protocol (TCP) for communication;
   receiving a first handshake response returned by the communication receiver for the first handshake request, and determining a first starting transmission position of data according to a last data receiving position in the first handshake response;
   communicating, by using the TCP, with the communication receiver starting from data corresponding to the first starting transmission position;
   in response to an actual latency between the communication initiator and the communication receiver exceeding a preset latency, determining that the communication initiator and the communication receiver belong to different computing power clusters, wherein each of the different computing power clusters comprises: a computing power cluster for training a generative large language model and composed of a set of graphical processors, wherein for each said computing power cluster its respective set of graphical processors is located in the same machine room, which is at a different location from the machine rooms of the other computing power clusters; and
   controlling to default to first use the RDMA protocol to communicate with the communication receiver belonging to a computing power cluster different from that of the communication initiator.

2. The method according to claim 1, wherein the obtaining the first packet loss rate corresponding to the RDMA protocol comprises:
   obtaining the first packet loss rate from a first shared memory corresponding to an RDMA network interface card; wherein the first packet loss rate is obtained from a register of the RDMA network interface card by a first packet loss rate acquisition process and is stored into the first shared memory, the first packet loss rate acquisition process is started when communicating using the RDMA protocol.

3. The method according to claim 1, further comprising:
   during a process of communicating with the communication receiver using the TCP, obtaining a second packet loss rate corresponding to the TCP protocol;
   in response to the second packet loss rate meeting a preset network quality requirement, initiating a second handshake request to the communication receiver for requesting to switch back to the RDMA protocol for communication;
   receiving a second handshake response returned by the communication receiver for the second handshake request, and determining a second starting transmission position of the data according to a last data receiving position in the second handshake response; and
   communicating, by using the RDMA protocol, with the communication receiver starting from data corresponding to the second starting transmission position.

4. The method according to claim 3, wherein the obtaining the second packet loss rate corresponding to the TCP protocol comprises:
   obtaining the second packet loss rate from a second shared memory; wherein the second packet loss rate is obtained by a collective communication library through calling a socket interface when using the TCP, and is stored into the second shared memory.

5. The method according to claim 3, wherein the preset network quality requirement includes at least one of following:
   a packet loss rate within a duration exceeding a first preset duration is less than a second preset packet loss rate, and a packet loss rate within consecutive training operations is less than the second preset packet loss rate; wherein the second preset packet loss rate is not greater than the first preset packet loss rate.

6. The method according to claim 1, wherein the actual latency is calculated through the following operations:
   determining a moment when the communication initiator sends out data to the communication receiver as a start moment;
   determining a moment when an acknowledgement notice is received as an end moment, the acknowledgement notice is returned by the communication receiver after receiving the data;

calculating to obtain the actual latency based on the start moment and the end moment.

7. The method according to claim 6, wherein the calculating to obtain the actual latency based on the start moment and the end moment comprises:
   calculating latency values corresponding to a preset number of start-end time pairs composed of start moments and corresponding end moments, to obtain a latency set; and
   calculating an average of the latency values in the latency set to obtain the actual latency.

8. The method according to claim 1, further comprising:
   in response to the actual latency between the communication initiator and the communication receiver not exceeding the preset latency, determining that the communication initiator and the communication receiver both belong to a same computing power cluster; and
   controlling to only use the RDMA protocol to communicate with the communication receiver belonging to the same computing power cluster.

9. The method according to claim 1, further comprising:
   in response to the first packet loss rate being lower than the first preset packet loss rate within a second preset duration, determining that the communication initiator and the communication receiver both belong to a same computing power cluster; and
   controlling to only use the RDMA protocol to communicate with the communication receiver belonging to the same computing power cluster.

10. The method according to claim 1, wherein the same computing power cluster comprises:
    a computing power cluster for training the generative large language model, composed of graphical processors located in a same machine room at a same location.

11. A communication apparatus for a computing power cluster, applied to a communication initiator, comprising:
    at least one processor; and
    a memory in communication connection with the at least one processor; wherein, the memory stores instructions executable by the at least one processor, and the execution of the instructions by the at least one processor enables the at least one processor to execute a communication method for a computing power cluster comprising:
    during a process of communicating with a communication receiver using Remote Direct Memory Access (RDMA) protocol, obtaining a first packet loss rate corresponding to the RDMA protocol;
    in response to the first packet loss rate being higher than a first preset packet loss rate, initiating a first handshake request to the communication receiver for requesting to switch to Transmission Control Protocol (TCP) for communication;
    receiving a first handshake response returned by the communication receiver for the first handshake request, and determining a first starting transmission position of data according to a last data receiving position in the first handshake response;
    communicating, by using the TCP, with the communication receiver starting from data corresponding to the first starting transmission position;
    in response to an actual latency between the communication initiator and the communication receiver exceeding a preset latency, determining that the communication initiator and the communication receiver belong to different computing power clusters, wherein each of the different computing power clusters comprises: a computing power cluster for training a generative large language model and composed of a set of graphical processors, wherein for each said computing power cluster its respective set of graphical processors is located in the same machine room, which is at a different location from the machine rooms of the other computing power clusters; and
    controlling to default to first use the RDMA protocol to communicate with the communication receiver belonging to a computing power cluster different from that of the communication initiator.

12. The apparatus according to claim 11, wherein the obtaining the first packet loss rate corresponding to the RDMA protocol comprises:
    obtaining the first packet loss rate from a first shared memory corresponding to an RDMA network interface card; wherein the first packet loss rate is obtained from a register of the RDMA network interface card by a first packet loss rate acquisition process and is stored into the first shared memory, the first packet loss rate acquisition process is started when communicating using the RDMA protocol.

13. The apparatus according to claim 11, wherein the method further comprises:
    during a process of communicating with the communication receiver using the TCP, obtaining a second packet loss rate corresponding to the TCP protocol;
    in response to the second packet loss rate meeting a preset network quality requirement, initiating a second handshake request to the communication receiver for requesting to switch back to the RDMA protocol for communication;
    receiving a second handshake response returned by the communication receiver for the second handshake request, and determining a second starting transmission position of the data according to a last data receiving position in the second handshake response; and
    communicating, by using the RDMA protocol, with the communication receiver starting from data corresponding to the second starting transmission position.

14. The apparatus according to claim 13, wherein the obtaining the second packet loss rate corresponding to the TCP protocol comprises:
    obtaining the second packet loss rate from a second shared memory; wherein the second packet loss rate is obtained by a collective communication library through calling a socket interface when using the TCP and is stored into the second shared memory.

15. The apparatus according to claim 13, wherein the preset network quality requirement includes at least one of following:
    a packet loss rate within a duration exceeding a first preset duration is less than a second preset packet loss rate, and a packet loss rate within consecutive training operations is less than the second preset packet loss rate; wherein the second preset packet loss rate is not greater than the first preset packet loss rate.

16. The apparatus according to claim 11, wherein the actual latency is calculated through the following operations:
    determining a moment when the communication initiator sends out data to the communication receiver as a start moment;
    determining a moment when an acknowledgement notice is received as an end moment, the acknowledgement notice is returned by the communication receiver after receiving the data; and calculating to obtain the actual latency based on the start moment and the end moment.

17. The apparatus according to claim 16, wherein the calculating to obtain the actual latency based on the start moment and the end moment comprises:

calculating latency values corresponding to a preset number of start-end time pairs composed of start moments and corresponding end moments, to obtain a latency set; and calculating an average of the latency values in the latency set to obtain the actual latency.

18. The apparatus according to claim 11, wherein the method further comprises:

in response to the actual latency between the communication initiator and the communication receiver not exceeding the preset latency, determining that the communication initiator and the communication receiver both belong to a same computing power cluster; and controlling to only use the RDMA protocol to communicate with the communication receiver belonging to the same computing power cluster.

19. The apparatus according to claim 11, wherein the method further comprises:

in response to the first packet loss rate being lower than the first preset packet loss rate within a second preset duration, determining that the communication initiator and the communication receiver both belong to a same computing power cluster; and controlling to only use the RDMA protocol to communicate with the communication receiver belonging to the same computing power cluster.

20. A non-transitory computer-readable storage medium storing computer instructions, where the computer instructions are used to cause a computer to execute the communication method for a computing power cluster according to claim 1.

* * * * *